United States Patent [19]

Hartmann

[11] Patent Number: 4,826,190

[45] Date of Patent: May 2, 1989

[54] DUAL WHEEL DRIVEN TRICYCLE WITH A FULLY ENCLOSED MULTIPLE SPEED DRIVE

[76] Inventor: Dirck T. Hartmann, 4121 Morning Star Dr., Huntington Beach, Calif. 92649

[21] Appl. No.: 157,578

[22] Filed: Feb. 18, 1988

[51] Int. Cl.⁴ .................. B62M 1/02; B62M 11/14
[52] U.S. Cl. ...................... 280/236; 74/750 B; 74/767; 74/781 B; 280/238; 280/259; 280/260; 280/263; 280/264; 280/282; 296/185
[58] Field of Search .............. 280/202, 210, 236, 238, 280/240, 259, 260, 263, 264, 282; 296/185; 74/750 B, 767, 781 B

[56] References Cited

U.S. PATENT DOCUMENTS

| 4,451,064 | 5/1984 | Perkins | 280/259 |
| 4,702,121 | 10/1987 | Hartmann | 280/238 X |
| 4,706,982 | 11/1987 | Hartmann | 280/238 |
| 4,721,015 | 1/1988 | Hartmann | 280/260 X |

*Primary Examiner*—Charles A. Marmor
*Assistant Examiner*—Mitchell J. Hill

[57] ABSTRACT

A pedal powered recumbent tricycle with a fully enclosed drive features an extruded aluminum frame within which the brake cables, steering linkage, and a seventeen speed planetary transmission are housed. Power from a pedal crank assembly is delivered to the transmission by a conventional drive chain and pair of sprockets inside a sealed cover on the right side of the frame. Power is delivered from the transmission to the rear axles by a second drive chain and pair of sprockets inside a sealed cover on the left side of the frame. A one way clutch on the inboard end of each axle provides for differential rear wheel speeds on turns, along with positive dual wheel traction.

9 Claims, 8 Drawing Sheets

DUAL WHEEL DRIVEN TRICYCLE WITH A FULLY ENCLOSED MULTIPLE SPEED DRIVE

REFERENCES CITED

U.S. Patents with related planetary transmissions

| | | |
|---|---|---|
| 2,687,050 | 8/1954 | Brown |
| 3,299,745 | 1/24/1967 | Toplis |
| 3,908,807 | 9/30/1975 | Ozaki et al |
| 3,934,493 | 1/27/1976 | Hillyer |
| 3,995,444 | 5/11/1976 | Munn |
| 3,995,503 | 12/7/1976 | Schultz |
| 4,065,984 | 1/3/1978 | Nakajima |
| 4,069,725 | 1/24/1978 | Segawa |
| 4,577,531 | 3/25/1986 | Bergles |
| 4,706,982 | 11/17/1987 | Hartmann |
| 4,715,246 | 12/29/1987 | Hartmann |
| 4,721,015 | 1/26/1988 | Hartmann |

This application has features in common with those of my copending applications listed below Enclosed Multiple Speed Drive For Low Maintenance Chain Driven Bicycles, Ser. No. 077,282, filing date July 22, 1987.

Multiple Speed Drive For Mountain Bicycles, Ser. No. 088,885, filing date Aug. 18, 1987.

BACKGROUND OF THE INVENTION

1. Field of the Invention

This invention relates generally to pedal powered recumbent tricycles and particularly to chain driven multiple speed planetary transmissions for pedal powered vehicles.

2. Description of the Prior Art

The most common multiple speed bicycles and tricycles use a chain and derailleur system with the chain exposed. The chain requires periodic cleaning and oiling to preserve pedalling efficiency and to prevent premature chain failure, and chain maintenance becomes particularly troublesome in dusty areas. Also when the rider is bearing down hard on the pedals on a hill, the derailleur frequently will not carry the chain to a lower gear so that the cyclist must anticipate the terrain and shift gears before getting on a hill in a gear that is too high. Further, all the gears with a conventional chain derailleur system are not efficiently usable because of the excessive angle the chain makes with the sprockets with some sprocket combinations. These problems are eliminated with the enclosed drive of the present invention, as will be seen.

It is well known that the aerodynamic drag coefficient for bicycles and tricycles with full fairings is a small fraction of that for unfaired bicycles with the rider in the conventional crouched riding position. A rider expending about one quarter horsepower on a conventional racing bicycle on level ground travels at twenty miles an hour, while with the same effort a fully faired recumbent tricycle will travel about thirty miles an hour. A fairing can also provide protection in cold or wet weather.

It is likely that the optimum pedal powered vehicle for everyday transportation as well as extended trips will ultimately be virtually maintenance free, extremely efficient, suitable for low cost mass production, and suitable for operation in areas as rainy as Seattle or as hilly as San Francisco either with or without a full fairing. The present invention is an attempt to satisfy these objectives.

SUMMARY OF THE INVENTION

The dual rear wheel driven recumbent tricycle according to the present invention includes an extruded aluminum frame within which the steering linkage, brake cables, and a four stage, seventeen speed planetary transmission are housed. Power is delivered to the transmission from the pedal crank assembly by a conventional pair of sprockets and drive chain housed inside a sealed, die cast aluminum cover bolted on the right side of the frame. Power from the transmission is delivered to the rear axles by a second pair of sprockets and drive chain inside a similar sealed cover bolted on the left side of the frame. The rear chain sprocket drives the two rear axles through a one way clutch on the inboard end of each axle which permit differential rear wheel speeds on turns. The transmission is located under the seat for easy rider access to a single shift control knob and a pair of ring gear locking handles on the right side, and a pair of tandemly oriented shift control knobs on the left side through which any one of the seventeen speeds available can be selected.

The four stage planetary transmission includes a sun gear carrier, a planet gear carrier, a single ring gear, a gear case, and a drive fitting driven by the right side chain sprocket, all rotatably mounted on bearings supported by a spindle clamped at its end on the right side in a square hole in the right side chain case cover so that it is restrained from axial movement or rotation, and supported on the opposite end by the left side chain case cover; four sets of different size planet gears with three planet gears in each set rotatably mounted on the planet gear carrier, with each planet gear in constant mesh with a sun gear freely rotating on the sun gear carrier, and in constant mesh with the ring gear; a drive selector mounted on the drive fitting with its axial position adjustable so that it can be positioned in any one of three positions with the right side shift control knob, to drive the sun gear carrier, the planet gear carrier, or the ring gear; a sun gear selector with its axial position adjustable with the outboard shift control knob on the left side so that it can be positioned in the plane of any one of the four freely rotating sun gears to lock the selected sun gear to the sun gear carrier; gear case closing plates threaded into the gear case on both left and right sides with right hand threads, with the transmission driven chain sprocket threaded onto the left side closing plate with right hand threads; provisions for selectively locking the ring gear against rotation with a locking sprocket and a pair of spring loaded pins that can be engaged or disengaged from the sprocket by flipping over the pair of handles on the right side; provisions for locking the sun gear carrier against rotation with a sun gear carrier locking ring with its axial position adjustable with the inboard shift control knob on the left side; and three one way clutches coupling respectively the ring gear, the planet gear carrier, and the sun gear carrier with the gear case.

Four first stage speeds (speeds one to four) are achieved with the drive selector positioned to drive the sun gear carrier with the sun gear carrier clutch disengaged, the ring gear locked against rotation and the planet gear carrier clutch driving the gear case, by positioning the sun gear selector in the plane of the smallest of the four sun gears for first speed, and in the plane of the largest sun gear for fourth speed.

Four second stage speeds (speeds five through eight) are achieved with the drive selector positioned to drive the ring gear with the ring gear clutch disengaged, the sun gear carrier locked against rotation and the planet gear carrier clutch driving the gear case, by positioning the sun gear selector in the plane of the largest of the four sun gears for fifth speed, and in the plane of the smallest sun gear for eighth speed.

A ninth speed is obtained with the drive selector positioned to drive the planet gear carrier with the sun gear carrier and the ring gear both free to rotate and with both the sun gear carrier and the ring gear clutches driving the gear case.

Four third stage speeds (speeds ten through thirteen) are achieved with the drive selector positioned to drive the planet gear carrier with the sun gear carrier locked against rotation and the ring gear clutch driving the gear case, by positioning the sun gear selector in the plane of the smallest of the four sun gears for tenth speed and in the plane of the largest sun gear for thirteenth speed.

Four fourth stage speeds (speeds fourteen through seventeen) are achieved with the drive selector positioned to drive the planet gear carrier with the ring gear locked against rotation and the sun gear carrier clutch driving the gear case, by positioning the sun gear selector in the plane of the largest of the four sun gears for fifteenth speed and in the plane of the smallest sun gear for seventeenth speed.

The seventeen speeds available with this particular embodiment of the present invention require each of four sun gears to be meshed with a different sized set of planet gears with all four sets of planet gears meshed with a single ring gear. The four stage transmission would have twenty one speeds if five sun gears were used, and thirteen speeds with three sun gears.

Other aspects and advantages of the present invention will become apparent from the following more detailed description taken in conjunction with the accompanying drawings.

DESCRIPTION OF THE PREFERRED EMBODIMENT

Figure 1:
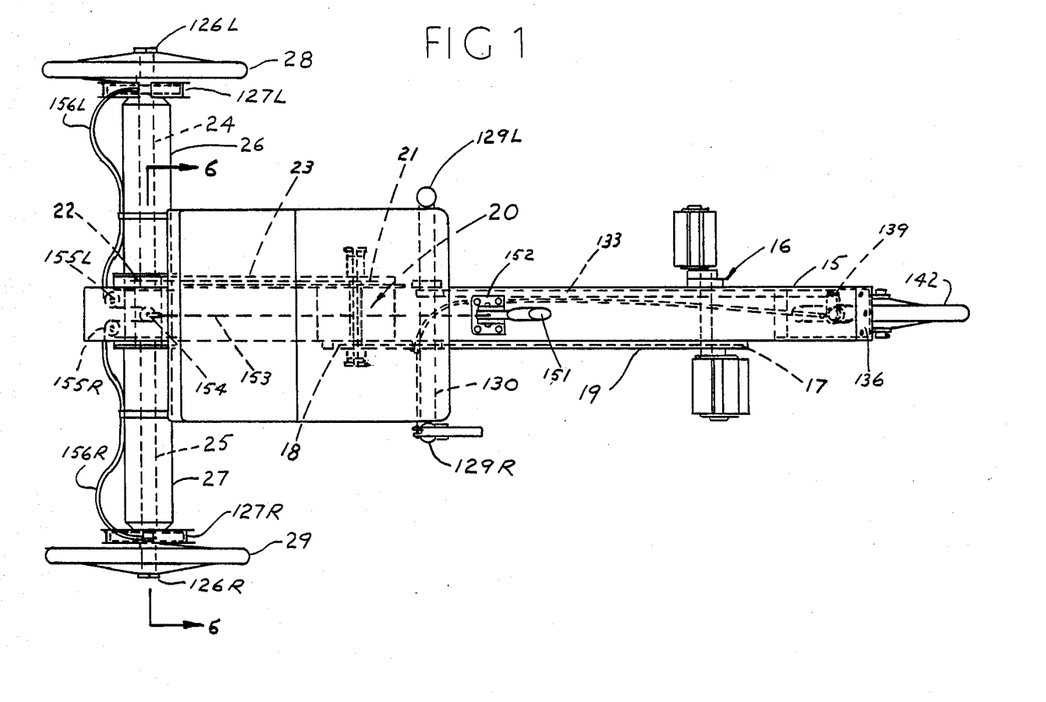
FIG. 1 is a plan view of the dual rear wheel driven recumbent tricycle according to the present invention.
Figure 2:
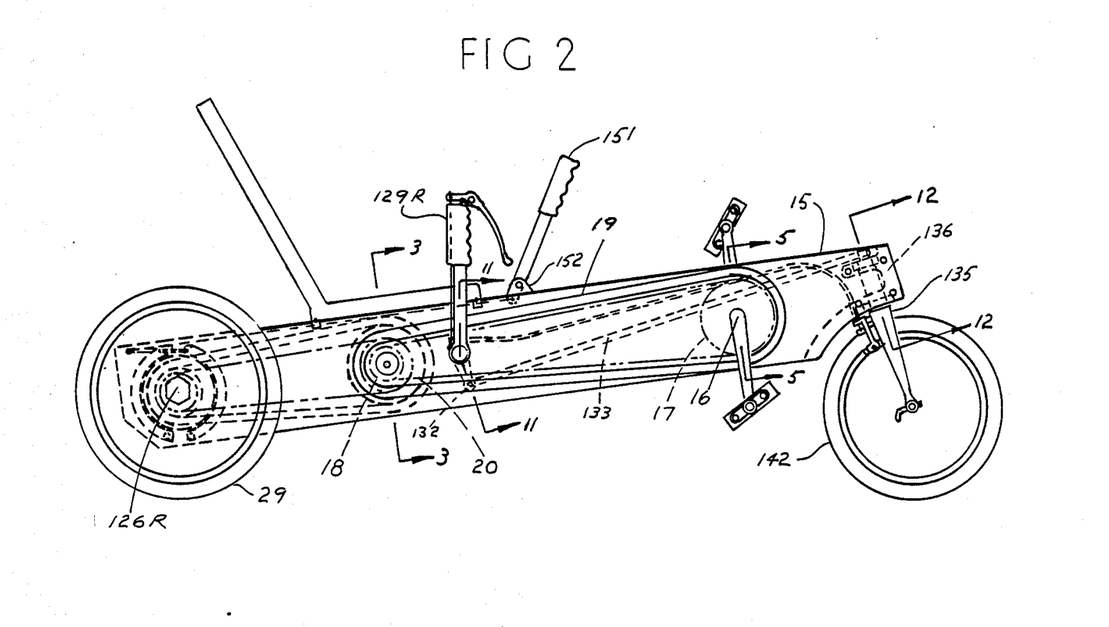
FIG. 2 is a right side elevation view of the same vehicle.

Referring to FIGS. 1 and 2, the fully enclosed multiple speed drive for a dual rear wheel driven recumbent tricycle in accordance with the present invention includes an extruded aluminum frame 15; a pedal crank set 16 for driving a forward chain sprocket 17 coupled by a bicycle chain to a sprocket 18; a die cast aluminum chain case 19 bolted on the right side of the frame 15 and enclosing the chain and sprockets 17 and 18; a four stage seventeen speed planetary transmission 20 driven by the sprocket 18; a chain sprocket 21 (on the left side of the frame 15) driven by the transmission 20 and coupled by a second bicycle chain with a chain sprocket 22; a die cast aluminum chain case 23 bolted on the left side of the frame 15 and enclosing the chain and sprockets 21 and 22; and a pair of axles 24 and 25 driven by the chain sprocket 22 and mounted in axle housings 26 and 27 and driving the rear wheels 28 and 29 respectively.

Figures 3, 4:
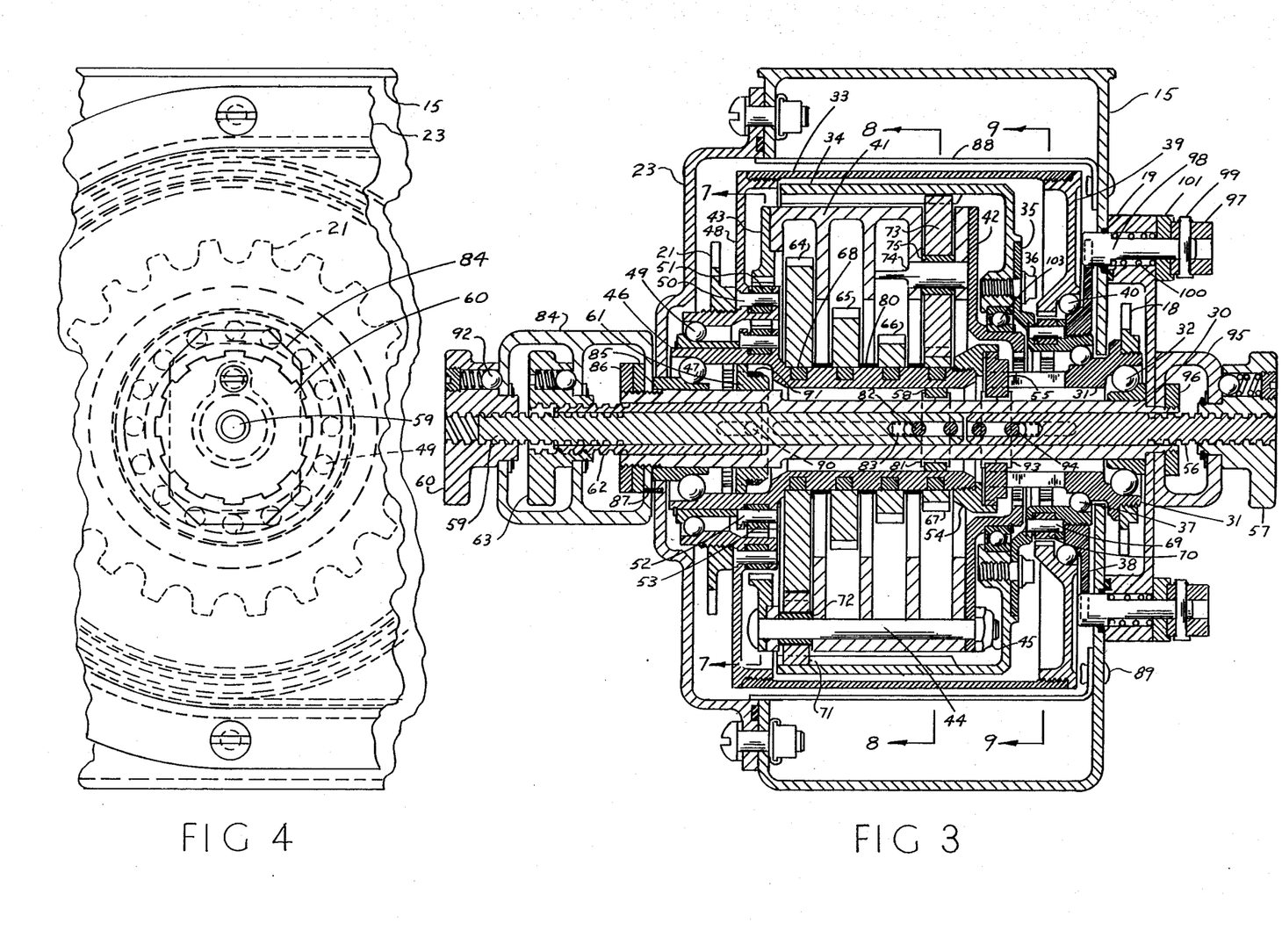
FIG. 3 is an enlarged cross sectional view taken along the line 3—3 of FIG. 2.
FIG. 4 is a partial left side elevation view of FIG. 3.

Referring now to FIG. 3, the four stage planetary transmission in accordance with the present invention includes a spindle 30 clamped at one end in a square hole in the right side chain case 19 so that it is restrained from rotation or axial movement; a drive fitting 31 driven by the chain sprocket 19 and mounted on an angular contact ball bearing 32 the inner race of which is supported by the spindle 30; a gear case 33; an internally toothed ring gear 34; a ring gear pawl plate 35 bolted to the ring gear 34 with the bolts 36 and mounted on an angular contact ball bearing 37 the inner race of which is the drive fitting 31; a ring gear locking sprocket 38 which is screwed on the ring gear pawl plate 35 with left hand threads; a gear case closing plate 39 screwed into the end of the gear case with right hand threads and seated on an angular contact ball bearing 40 the inner race of which is the ring gear locking sprocket 38; a planet gear carrier 41 on which four sets of different size planet gears with three planet gears in each set are rotatably mounted; a planet gear carrier drive plate 42 and a planet gear carrier ratchet plate 43 both of which are clamped to the planet gear carrier 41 with three equally spaced through bolts 44 and self locking nuts 45; a sun gear carrier 46 seated on an angular contact ball bearing 47 the inner race of which is seated on the spndle 30; a gear case closing plate 48, which is threaded into the left end of the gear case 33 with right hand threads, is seated on an angular contact ball bearing 49 the inner race of which is seated on the sun gear carrier 46; the chain sprocket 21 is threaded onto the gear case closing plate 48 with right hand threads and serves to retain a pair of pins 50 mounting a pair of spring loaded pawls 51 in the gear case closing plate 48 which engage ratchet teeth in the planet gear carrier ratchet plate 43 for driving the sprocket 21 from the planet gear carrier 41; a pair of pins 52 retained in the sun gear carrier 45 by the inner race of the bearing 49, mount a pair of spring loaded pawls 53 which engage ratchet teeth in the gear case closing plate 48 for driving the sprocket 21 from the sun gear carrier 46; a pair of pins 69 in the ring gear pawl plate 35 mounting a pair of spring loaded pawls 70 which engage ratchet teeth in the gear case closing plate 39 for driving the sprocket 21 from the ring gear 34; a drive ring 54 threaded on the end of the sun gear carrier 46; a drive selector ring 55 slidably mounted on the drive fitting 31; an acme threaded screw 56 and shift knob 57 for controlling the axial position of the drive selector ring 55; a sun gear selector ring 58; an acme threaded screw 59 and a shift knob 60 for controlling the axial position of the sun gear selector ring 58; a sun gear carrier locking ring 61 keyed to and slidably mounted on the spindle 30; an acme threaded sleeve 62 and a shift knob 63 for controlling the axial position of the sun gear carrier locking ring 61; and four sun gears 64, 65, 66, and 67 with each sun gear mounted in the plane of and keyed to the two halves of a split ring 68 freely rotating in a circumferential groove in the sun gear carrier 46.

Figure 8:
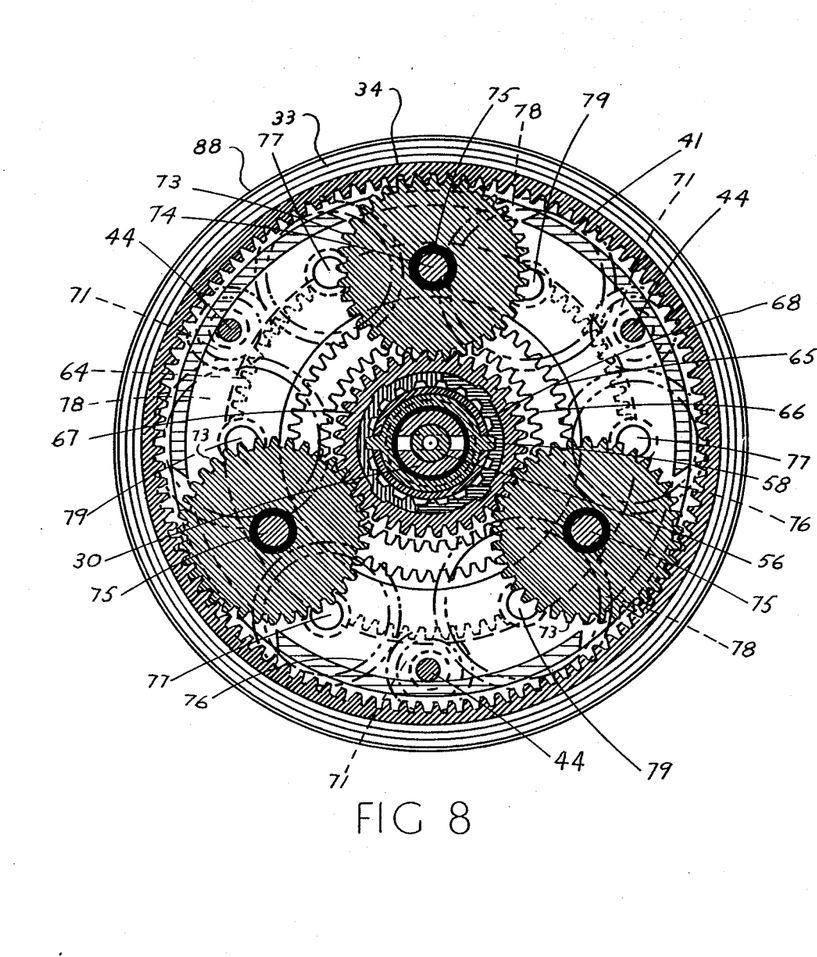
FIG. 8 is a cross sectional view taken along the line 8—8 of FIG. 3.

The planet gear carrier 41, according to the preferred embodiment, is integrally machined from thick walled aluminum tubing with a cylindrical outer shell and five transverse interior bulkheads. As shown in FIG. 8, milled slots cut with a side milling cutter through the cylindrical outer shell of the planet gear carrier 41 provide clearance for the planet gears to mesh with the ring gear. As shown in FIG. 3, the width of the slots milled through the cylindrical outer shell of the planet gear carrier is equal to the width of the clear space between the interior transverse bulkheads of the planet gear carrier 41.

Three planet gears 71, in mesh with the sun gear 64 and the ring gear 34, are mounted in the planet gear carrier 41 on the three equally spaced through bolts 44. An oil filled sintered bronze bushing 72 is press fit in each planet gear for free turning on the polished bolts 44. The length of the sintered bronze bushings is slightly greater then the width of the planet gears they are pressed into and closely matches the width of the open space between the interior transverse bulkheads of the planet gear carrier 41 which maintain the axial position of the planet gears.

Referring to FIGS. 3 and 8, three planet gears 73, meshed with the sun gear 67, are mounted on polished pins 74. The axial position of the pins 74 is fixed in the planet gear carrier 41 on the right end by the planet gear carrier drive plate 42 and on the left end by a reduced diameter integral extension of the pin 74 engaging a transverse interior bulkhead of the planet gear carrier 41. Oil filled sintered bronze bushings 75 are press fit in the planet gears 73 for free running on the polished pins 74.

As shown in FIG. 8, three planet gears 76 meshed with the sun gear 66, are mounted on polished pins 77. The axial position of the polished pins 77 is maintained by reduced diameter integral extensions on both ends, with the end on the right engaging the planet gear carrier driving plate 42, and the end on the left engaging an interior transverse bulkhead of the planet gear carrier 41. Three planet gears 78 meshed with the sun gear 65 are mounted on the polished pins 79. The axial position of the pins 79 is also maintained by reduced diameter integral extensions on both ends engaging the planet gear carrier driving plate 42 on the right end, and the end interior transverse bulkhead of the planet gear carrier 41 on the left end. The axial position of the sun gears 64, 65, 66, and 67 on the sun gear carrier 46 is maintained by an integral shoulder on the left side of sun gear 65, a thin spacer ring 80 located between each adjacent pair of sun gears, and the sun gear carrier drive ring 54 threaded on the right end of the sun gear carrier 46.

Referring again to FIGS. 3 and 8, the sun gear selector ring 58 rotates freely between a pair of flanged bushings 81 slidably mounted on the spindle 30. The flanged bushings 81 are captive between a pair of transverse pins 82 each of which passes through a hole in the acme threaded screw 59 and through diametrically opposed slots in the spindle 30. When the sun gear selector ring 58 is located in the plane of the smallest sun gear 67 (as shown in FIG. 3), a transverse pin 82 is at one end of the diametrically opposed slots in the spindle 30; and when the sun gear selector ring 58 is located in the plane of the largest sun gear 65, the other transverse pin is at the other end of the diametrically opposed slots. A shoulder is machined into the ends of each transverse pin 82 with the distance between the shoulders on opposite ends of the pin approximately equal to the inside diameter of the flanged bushings 81 so that the flanged bushings keep the pins 82 centered. The diameter of the transverse pin 82 passing through the hole in the acme threaded screw 59 closest to its end (the outboard hole) is a close fit in the hole. However, the inboard hole through the acme threaded screw 59 is elongated slightly to permit installation of the inboard transverse pin 82. A stiff compression spring 83 located in an axial hole drilled in the end of the acme threaded screw, keeps the inboard transverse pin 82 pressed firmly against the inboard flanged bushing 81 and keeps the mating flanged bushing pressed against the outboard transverse pin 82 in its close fitting hole.

The threads on the outboard end of the acme threaded screw 59 engage a shift knob 60 captive in a mount 84 which is preferably made from a short length of aluminum extrusion. The mount 84 is held against the inner race of the angular contact ball bearing 47 by the nuts 85 and 86 which are used to adjust and secure the preload of all the angular contact ball bearings. The mount 84 is prevented from rotating by the pin 87. The lead on the acme threads is chosen so that one 360 degree rotation of the shift knob 60 moves the sun gear selector ring from the plane of one sun gear to the plane of the adjacent sun gear. The ends of the slot in the spindle 30 prevent the sun gear selector being driven beyond either the smallest sun gear 67 or the largest sun gear 65. Three rotations of the shift knob 60 move the sun gear selector 81 from the plane of the smallest sun gear to the plane of the largest sun gear. The spring loaded ball 92 and a detent in the mount 84 signal the completion of each revolution and prevent any movement of the sun gear selector ring between desired speed changes.

As shown in FIG. 8, each half of the split ring 68 has a pair of short radial projections which key it to the sun gear in the plane of which it is located, and an internal tooth form matching the form of the ends of the radial projections on the sun gear selector ring 58 which slide in a pair of diametrically opposed axial grooves in the sun gear carrier. Thus the selected sun gear with its mating pair of split rings, which otherwise rotates independently, is locked to the sun gear carrier 46 when the sun gear selector ring 58 is positioned in its plane by the acme threaded screw 59 and shift knob 60.

Figure 7:
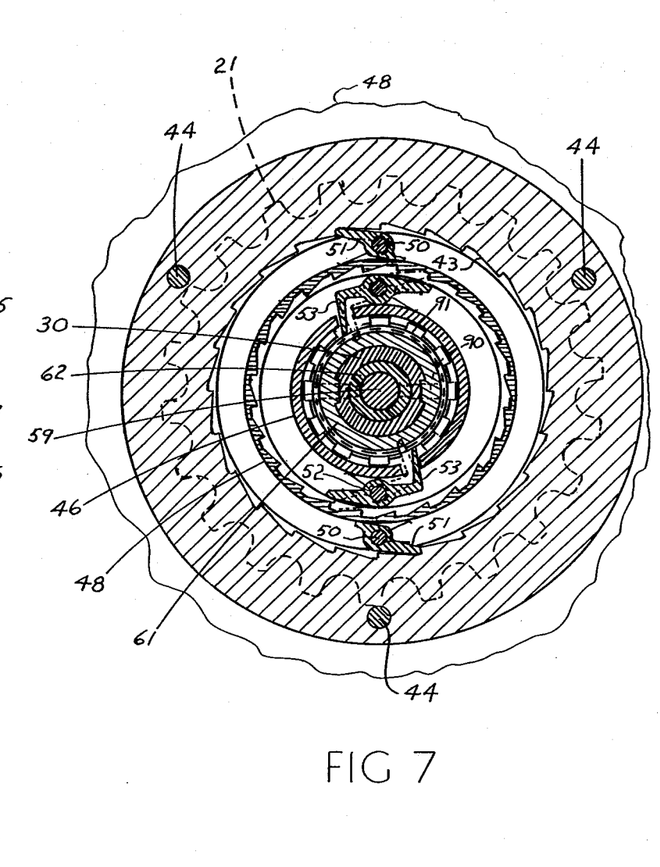
FIG. 7 is a cross sectional view taken along the line 7—7 of FIG. 3.

Referring to FIGS. 3 and 7, the axial position of the sun gear carrier locking ring 61 is controlled by the acme threaded sleeve 62 and the shift knob 63. A pair of transverse pins 90 installed in diametrically opposed radial holes in the sun gear carrier locking ring 61 pass through elongated holes in the spindle 30 and engage reduced diameter radial holes through the acme threaded sleeve 62. The shoulder where the diameter is reduced keeps the inboard end of the transverse pin 90 from contacting the acme threaded pin 59 and the pair of diametrically opposed pins is held captive inside a thin sleeve 91 threaded onto the sun gear carrier locking ring 61 with right hand threads. A pair of diametrically opposed internal radial teeth on the locking ring 61 slide in axial grooves in the spindle 30 and transfer torque from locking ring to the spindle.

As shown in FIG. 7, when the locking ring 61 is in the position shown in FIG. 3 the thin sleeve 91 holds the spring loaded pawls 53 on the sun gear carrier 46 out of engagement with the ratchet teeth on the gear case closing plate 48 so that the sun gear carrier can be driven at a higher speed than the gear case as is required during first stage operation.

Referring again to FIG. 3, when the locking ring 61 is moved outboard a short distance with the acme threaded sleeve 62 and shift knob 63, external teeth on the locking ring 61 engage internal teeth on the sun gear carrier 46 and lock the sun gear carrier against rotation as is required for second and third stage operation.

When the locking ring 61 is moved outboard further to the end of the travel permitted by the elongated holes through the sleeve 30, the sun gear carrier 46 is free to rotate with the sun gear carrier pawls 53 engaging the ratchet teeth on the gear case closing plate as is required for fourth stage operation. The lead for the threads on the acme threaded sleeve 62 is selected so that one 360 degree rotation of the shift knob 63 moves the locking ring 61 from the inboard positon required for first stage to the intermediate position required for second and third stage, and a second 360 degree rotation of the shift knob 63 moves the locking ring to the outboard position required for fourth stage. Each of the three position required for the locking ring 61 is indicated and held by a spring loaded ball 92 in the shift knob 63 engaging a detent in the mount 84. The length of the diametrically opposed elongated holes through the spindle 30 prevents the locking ring 61 from being driven past either the inboard or the outboard position.

Figures 9, 10, 10A:
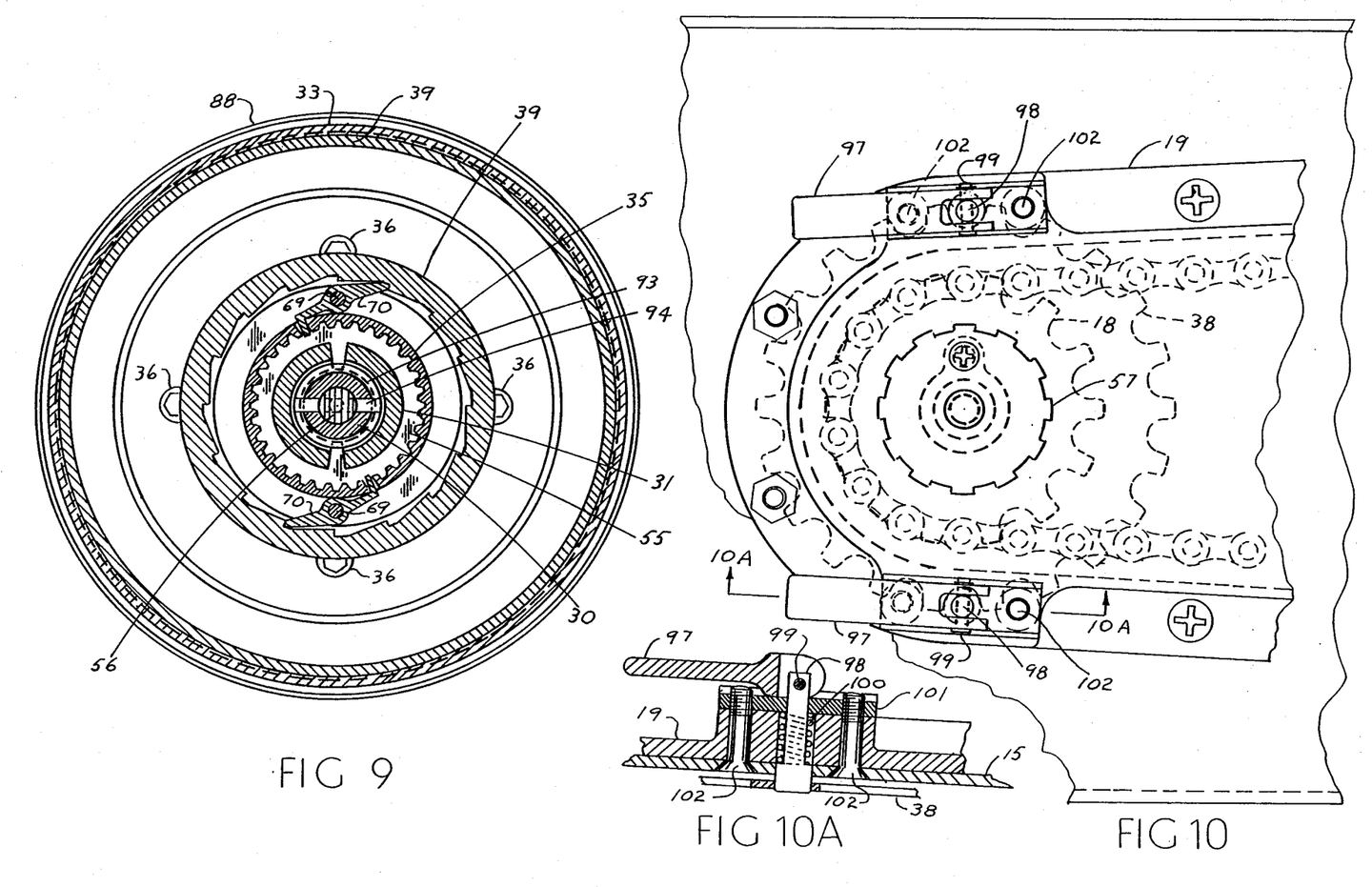
FIG. 9 is a cross sectional view taken along the line 9—9 of FIG. 3.
FIG. 10 is a partial right side elevation view of FIG. 3.
FIG. 10A is a partial cross sectional view taken along the line 10A—10A of FIG. 10.

Referring to FIG. 3 and particularly to FIG. 9, the drive fitting 31 has two diametrically opposed slots which extend axially outboard from its inboard end and which engage two internal radial projections on the drive selector ring 55 for transferring torque from the drive fitting to the drive selector ring. External teeth on the drive selector ring match internal teeth on the sun gear carrier drive ring 54, and also internal teeth on the planet gear carrier drive plate 42, and internal teeth on the ring gear pawl plate 35, for selectively driving any one of these three elements at the speed of the chain sprocket 18 when the drive selector ring is positioned so that its external teeth mesh with the internal teeth of the element to be driven. The two internal radial projections on the drive selector ring 55 rotate freely between the flanges of a pair of bushings 93 which are slidably mounted on the spindle 30 and which control the axial position of the drive selector ring with an arrangement identical to that described for the sun gear selector ring. The flanged bushings 93 are captive between a pair of transverse pins 94. A shoulder machined on each end of the transverse pin 94 fits inside the flanged bushing 93 which keeps the pin centered. Each transverse pin 94 is captive in a hole in an acme threaded screw 56 and free to slide axially in diametrically opposed slots in the spindle 30. The axial position of the acme threaded screw 56 is controlled with a shift knob 57 which is captive in a mount 95 preferably made from a short length of aluminum extrusion. The mount 95 is clamped on the square end of the spindle 30 with a nut 96. The lead for the threads on the acme threaded screw 56 is selected so that rotating the shift knob 57 through 360 degrees in one direction moves the drive selector ring 55 from the planet gear carrier drive plate 42 to the sun gear carrier drive ring 54, and rotating the shift knob 57 360 degrees in the opposite direction moves the drive selector ring 55 from the planet gear carrier drive plate to the ring gear pawl plate 35. As shown in FIG. 9, when the external teeth on the drive selector ring 55 move into engagement with the internal teeth on the ring gear pawl plate 35, they force the spring loaded pawls 70 out of engagement with the ratchet teeth on the gear case closing plate 39, as is required for second stage operation.

Referring now to FIGS. 3, 10, and 10A, each one of a pair of ring gear locking handles 97 is joined to a ring gear locking pin 98 by a transverse pin 99. The handle 97 holds the locking pin 98 captive inside a mounting plate 101 which is clamped to the chain case 19 by two screws 102 installed from inside the frame 15. A compression spring 100 installed between a shoulder on the locking pin 98 and the mounting plate 101 keeps the handle pressed firmly against the mounting plate 101. The transverse pin 99 is located off the center of the handle 97 a distance equal to one half the axial travel desired for the locking pin 98 between the inboard position where it engages the ring gear locking sprocket 38, and the outboard position where it clears the locking sprocket, so that rotating the pair of handles 180 degrees changes from a ring gear locked condition required for the first and fourth stages, to a ring gear unlocked condition required for the second and third stages.

As shown in FIG. 3, a pair of angular contact ball bearings maintains the axial position of each of the rotatably mounted elements except the planet gear carrier 41 the axial position for which is maintained by a ball bearing 103 with its outer race captive between a shoulder on the ring gear 34 and the ring gear pawl plate 35, and its inner race between a snap ring and a shoulder on the planet gear carrier drive plate 42.

A flanged cylindrical sleeve 88, preferably formed from thin walled aluminum tubing, is inserted through a hole in the left side of the frame 15 and fastened to the right side of the frame 15 with rivets 89 to shield the volume occupied by the transmission 20.

Figure 5:
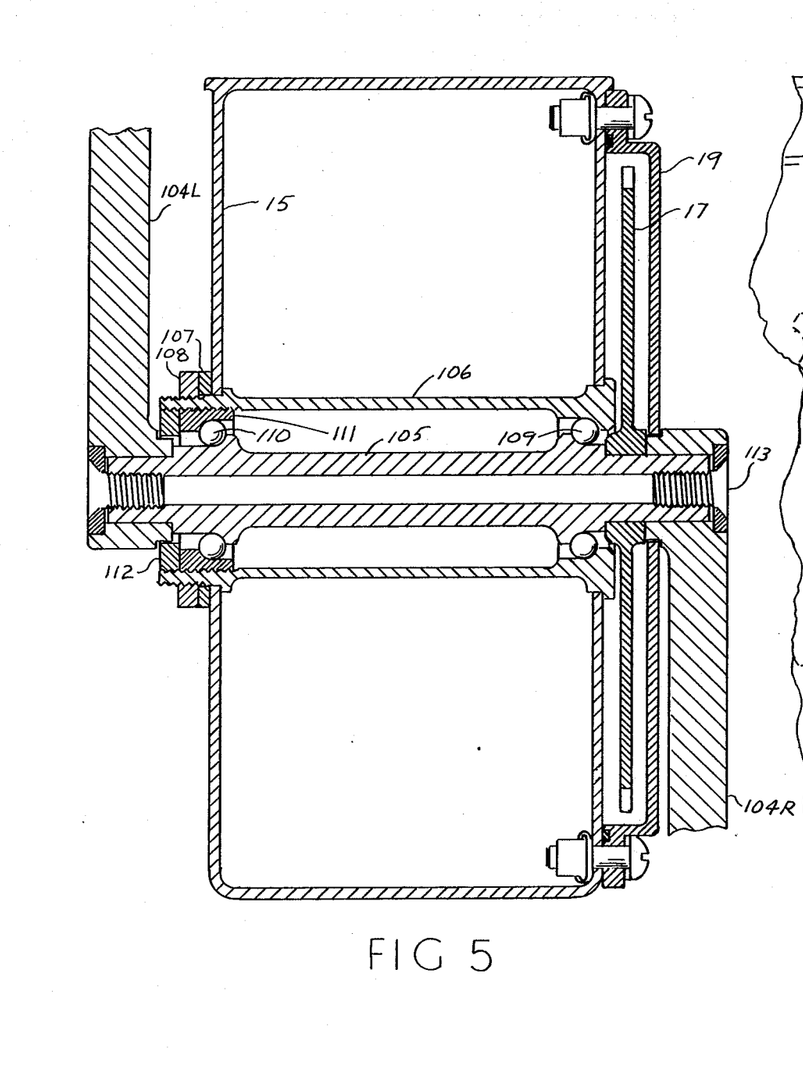
FIG. 5 is an enlarged cross sectional view taken along the line 5—5 of FIG. 2.
Figure 5A:
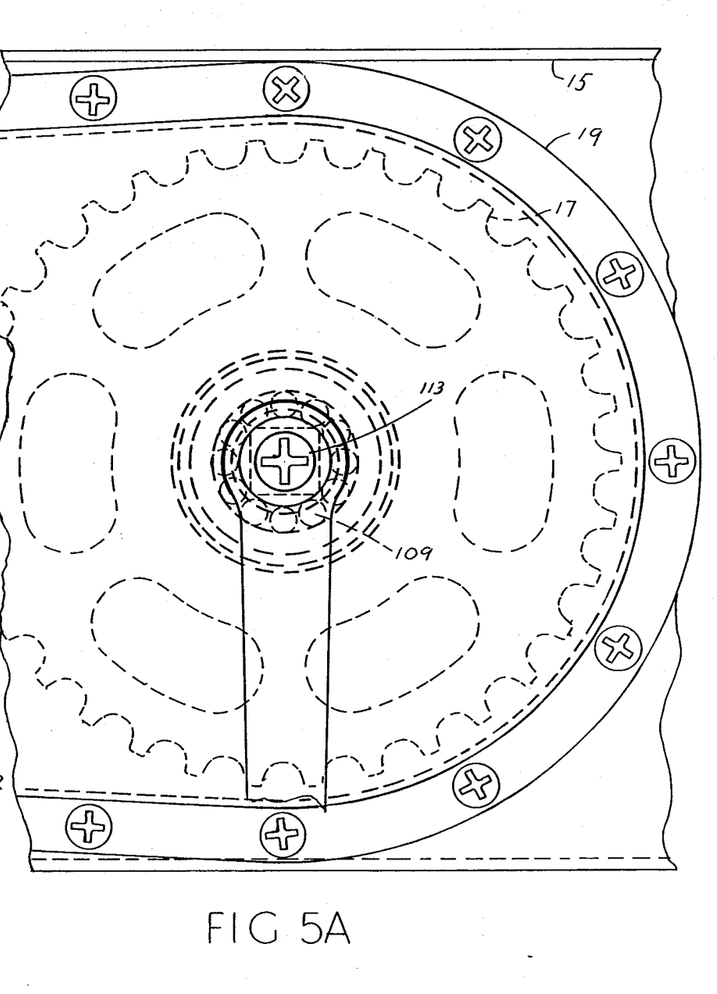
FIG. 5A is a partial right side elevation view of FIG. 5.

Referring to FIG. 5, the crank set 16 comprises left and right pedal crank arms 104L and 104R, a pedal drive shaft 105, a bearing sleeve 106, and a pair of angular contact ball bearings 109 and 110. The chain sprocket 17 is clamped between a shoulder on the drive shaft 105 and the pedal crank arm 104R. Both ends of the drive shaft 105 are square for the transfer of pedal torque to the chain sprocket. The pedal crank arms are fixed on the drive shaft by the flush head screws 113 and washers 114. The bearing sleeve 106 is inserted through a hole in the right side of the frame 15 and fixed in a smaller hole in the left side of the frame 15 by a washer 107 and a nut 108 which clamp the frame against a shoulder on the bearing sleeve. The drive shaft 105 serves as the inner race for the angular contact ball bearings 109 and 110 which support it in a conventional manner. The bearing sleeve 106 is the outer race on the right side for the bearing 109 and transfers bearing load to the frame 15. A separate outer race 111 is threaded into the sleeve 106 on the left side and used to adjust the bearing preload which is secured with a locknut 112.

Figures 6, 6A:
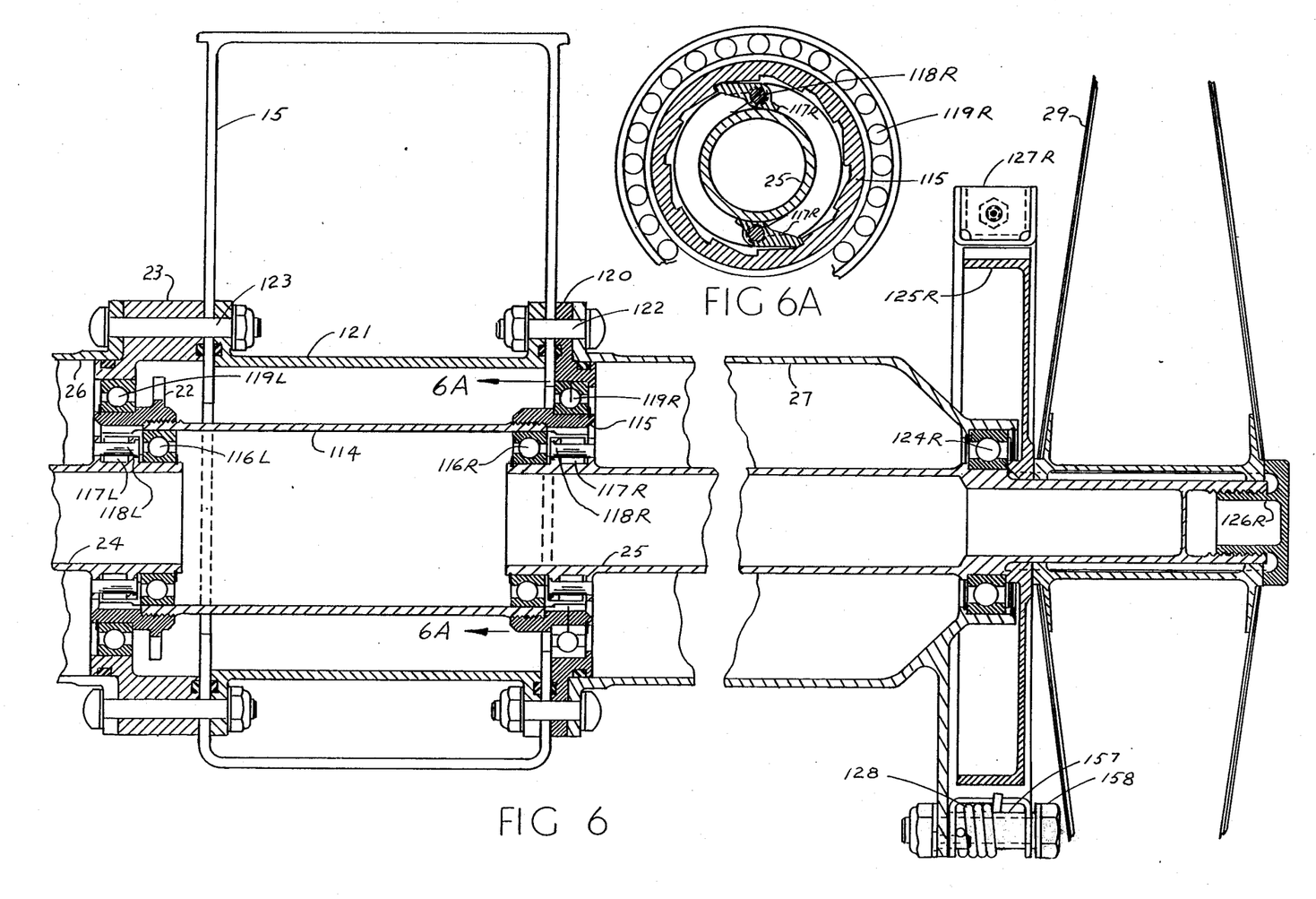
FIG. 6 is an enlarged cross sectional view taken along the line 6—6 of FIG. 1.
FIG. 6A is a partial cross sectional view taken along the line 6A—6A of FIG. 6.

Referring now to FIG. 6, output power from the transmission 20 is delivered from the sprocket 21 by a conventional bicycle chain to the sprocket 22 driving the rear wheels 28 and 29, with the chain and the sprockets 21 and 22 housed inside a die cast aluminum chain case 23. The sprocket 22 has internal ratchet teeth which engage a pair of spring loaded pawls 117L mounted on pins 118L in the inboard end of the left axle 24, for transferring drive torque from the sprocket to the left axle. The sprocket is threaded on the left end of a torque tube 114 with left hand threads for transferring drive torque to a fitting 115 which is threaded on the opposite end of the torque tube 114 (also with left hand threads). Ratchet teeth on the fitting 115 engage spring loaded pawls 117R mounted on pins 118R in the inboard end of the axle 25 for transferring drive torque from the sprocket 22 to the right axle.

The fitting 115 is mounted inside the inner race of a ball bearing 119R which is fixed between a shoulder and a snap ring on the fitting 115. The outer race of the bearing 119R is seated inside a plate 120 which is clamped between a flange on the right side axle housing 27 and the frame 15 by the bolts 122 which also clamp a flange on the right end of a bridging tube or cylinder 121 to the inside of the frame 15. The outer race of the bearing 119R is clamped between the frame 15 and a flange on the plate 120 and secures the axial position of the fitting 115, the torque tube 114, and the sprocket 22.

The sprocket 22 is mounted inside the inner race of a bearing 119L which is captive between a shoulder and a snap ring on the sprocket. The outer race of the bearing 119L is seated inside the chain case 23 and is without axial restraint. The chain case 23 is clamped between the flange of the left side axle housing 26 and the frame 15 by the bolts 123 which also clamp a flange on the end of the bridging tube 121 to the frame 115.

The inboard ends of the axles 24 and 25 are supported inside the inner races of the ball bearings 116L and 116R which are captive on the axles 24 and 25. The outer races of the bearings 116L and 116R are seated inside the torque tube 128 and are unrestrained axially. The outer ends of the axles 24 and 25 are supported inside the inner races of ball bearings 124L and 124R respectively, with the inner races of the bearings clamped between a flange on the end of each axle and the brake drums 125L and 125R which are preloaded against the bearing inner races by the wheels 28 and 29 and the wheel mounting bolts 126L and 126R threaded into the outboard end of each axle. The outer races of the ball bearings 124L and 124R are captive between a shoulder and a snap ring in the outboard ends of the axle housings 26 and 27 so that the axle housings provide axial restraint to both wheels and axles. The outboard ends of the axles are splined for the transfer of driving torque from the axles to the wheels and braking torque from the brake drums 125L and 125R to the wheels. Each half of the left and right side brake shoes 127L and 127R is mounted on a bushing 157 clamped to the axle housing with a bolt 158.

As shown in FIG. 1, the rear brake shoes 127L and 127R are actuated by a brake handle 151 mounted in a bracket 152 which is bolted to the frame 15. The lower end of the handle 151 extends down through a slot in the frame 15 and is attached to a cable 153 connected to a pulley 154 that is mounted in a short track permitting axial movement of the pulley 154. A second cable wraps 180 degrees around the pulley 154 and 90 degrees around each of the fixed pulleys 155L and 155R and passes out through the conventional cable guides 156L and 156R to the brake shoes 127L and 127R. A torsion spring 128 is installed over the bushing 157 and provides for brake shoe retraction and cable tension preload.

Figures 11, 12:
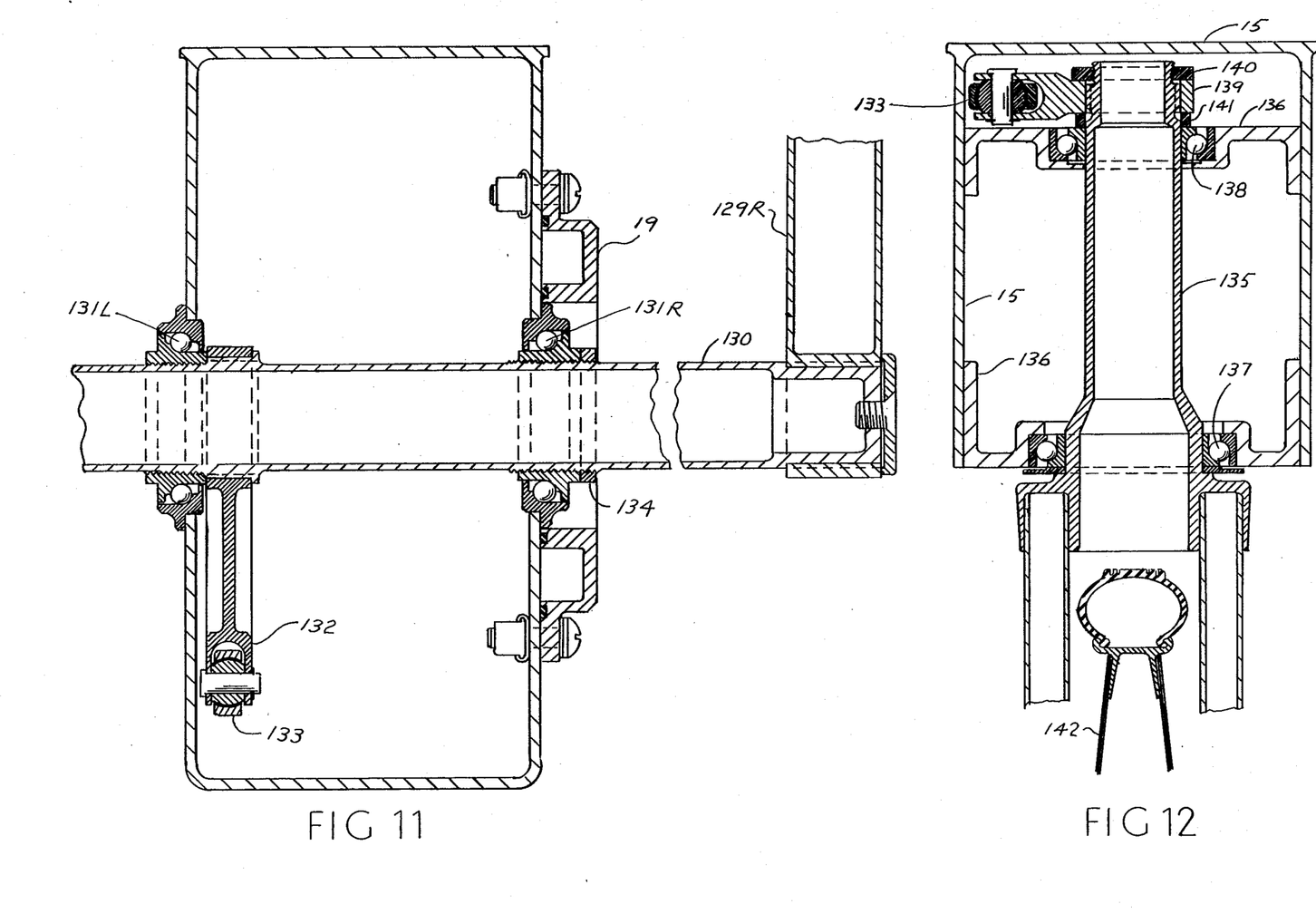
FIG. 11 is an enlarged partial cross sectional view taken along the line 11—11 of FIG. 2.
FIG. 12 is an enlarged cross sectional view taken along the line 12—12 of FIG. 2.

Referring to FIGS. 1, 2, and particularly 11, steering torque is transferred from a pair of handles 129L and 129R to a steering tube 130 which is supported on angular contact ball bearings 131L and 131R. The outer races of the bearings 131L and 131R are press fit in the frame 15. A torque arm 132 which engages a spline on the torque tube 130, is clamped against a flange on the torque by the inner race of the bearing 131L which is threaded on the torque tube. Preload of the bearings 131L and 131R is adjusted with the inner race of the bearing 131R which is also threaded on the torque tube 130, and secured with the locknut 134. The torque arm 132 is joined by a pin to a plane spherical bearing in the aft end of a strut 133 coupling the steering tube with a front fork 135.

Referrng now to FIG. 12, the front fork 135 is mounted on the angular contact ball bearings 137 and 138 with the outer races of the bearings seated in an aluminum casting 136 which is bolted in the open front end of the frame 15. A torque arm 139 is splined to the front fork 135 above the bearing 138. A nut 140 is threaded on the top of the front fork 135 and clamps the torque arm 139 against a spacer 141 which preloads the angular contact bearings and secures the axial position of the front fork in the aluminum casting 136. A plane spherical bearing in the strut 133 is pinned to the torque arm 139 so that the strut 133 transfers steering torque from the handles 129L and 129R to the front fork 135. The front wheel 142 is joined to the front fork in a conventional manner.

In the example design developed to illustrate the fully enclosed multiple speed drive in accordance with a preferred embodiment of this invention, 34 cogs and 14 cogs are selected for the sprockets 17 and 18 in the right side chain case, and 22 cogs and 16 cogs are selected for the sprockets 21 and 22 respectively, in the left side chain case. Twenty four pitch involute gears with a 20 degree pressure angle are selected for the planetary transmission, with 108 teeth and a resultant pitch diameter of 4.5 inches for the ring gear 34. The transmission ratios are summarized in the accompanying table where, for each of the seventeen speeds, N is the number of teeth on the selected sun gear.

The transmission ratio during first stage operation where the sun gear carrier is driven with the ring gear locked and the planet gear carrier clutch driving, is given by $R = 1/(1 + 108/N)$.

The transmission ratio during second stage operation where the ring gear is driven with the sun gear carrier locked and the planet gear carrier clutch driving, is given by $R = 1/(1 + N/108)$.

The transmission ratio where the planet gear carrier is driven and both the sun gear carrier and the ring gear are free to rotate is 1.000.

The transmission ratio during third stage operation where the planet gear carrier is driven with the sun gear carrier locked and the ring gear clutch driving, is given by $R = 1 + N/108$.

The transmission ratio during fourth stage operation where the planet gear carrier is driven with ring gear locked and the sun gear carrier clutch driving is given by $R = 1 + 108/N$.

The tricycle ratio, which is the transmission ratio multiplied by the sprocket (34/14 × 22/16) is included in the table as is the equivalent wheel diameter for 14 inch diameter rear wheels, as well as the tricycle speed for a pedal speed of 90 RPM.

| SPEED | N | TRANSMISSION RATIO | TRICYCLE RATIO | EQUIV. WHEEL DIA(inches) | MPH |
|---|---|---|---|---|---|
| first stage | | | | | |
| one | 36 | .25 | .835 | 11.7 | 3.13 |
| two | 42 | .28 | .935 | 13.1 | 3.5 |
| three | 54 | .33 | 1.112 | 15.6 | 4.17 |
| four | 78 | .42 | 1.40 | 19.6 | 5.25 |
| second stage | | | | | |
| five | 78 | .581 | 1.931 | 27.1 | 7.3 |
| six | 54 | .667 | 2.23 | 31.2 | 8.35 |
| seven | 42 | .720 | 2.40 | 33.6 | 9.01 |
| eight | 36 | .750 | 2.50 | 35.0 | 9.39 |
| nine | (direct drive) | 1.00 | 3.34 | 46.7 | 12.50 |
| third stage | | | | | |
| ten | 36 | 1.33 | 4.5 | 63 | 16.7 |
| eleven | 42 | 1.39 | 4.64 | 65 | 17.4 |
| twelve | 54 | 1.50 | 5.00 | 70 | 18.8 |
| thirteen | 78 | 1.72 | 5.75 | 80.5 | 21.6 |
| fourth stage | | | | | |
| fourteen | 78 | 2.29 | 7.96 | 111.4 | 29.8 |
| fifteen | 54 | 3.00 | 10.02 | 140.3 | 37.5 |
| sixteen | 42 | 3.57 | 11.92 | 167 | 44.7 |
| seventeen | 36 | 4.00 | 13.36 | 187 | 50.1 |

The sprocket sizes, transmission gears, and the resultant speed ratios and equivalent wheel diameters listed above are presented for purpose of illustration only and the present invention should not be considered as limited to them.

Figure 13:
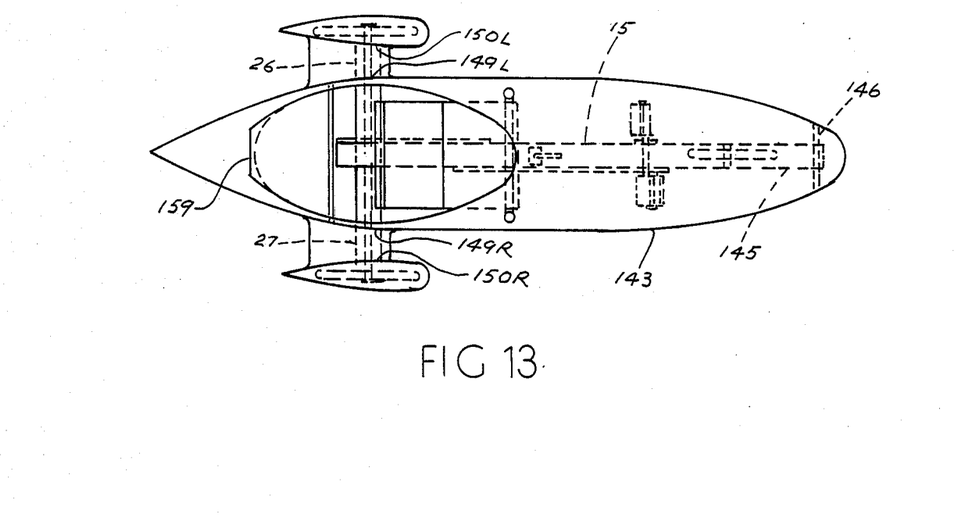
FIG. 13 is a reduced scale view of the recumbent tricycle shown in FIG. 1 with a full aerodynamic fairing added.
Figure 14:
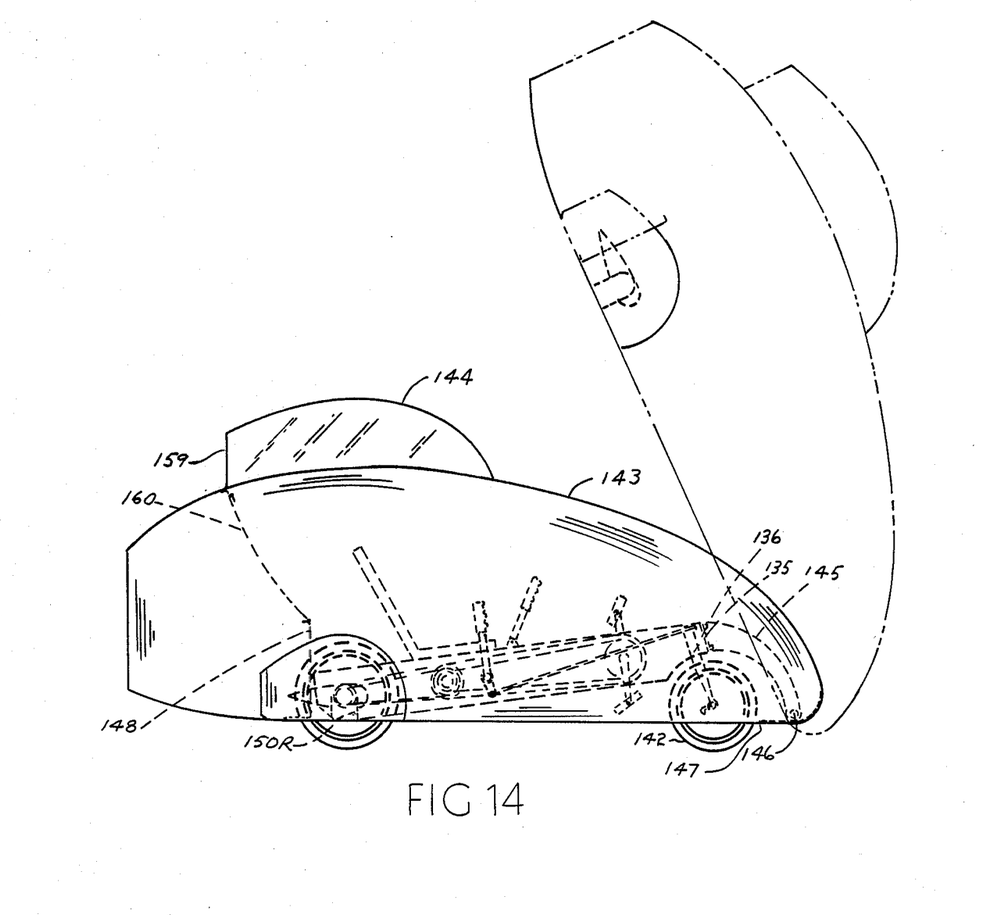
FIG. 14 is a right side elevation view of the vehicle shown in FIG. 13.

The high gear ratios and high speeds shown for fourth-stage operation are practical and achievable only for a pedal powered vehicle with a full fairing having a very low aerodynamic drag coefficient and small frontal area. A candidate fairing with the requisite characteristics is shown in FIGS. 13 and 14. A hinge arm 145 is bolted to the aluminum casting 136 which is bolted in the forward open end of the extruded aluminum frame 15 and which mounts the front fork 135. A fairing 143, preferably molded using an advanced composite, is joined to the hinge arm 145 through a pivot 146, and is supported through the engagement of cutouts in the fairing 143 (on the left and right sides at 149L and 150L and 149R and 150R) with the axle housings 26 and 27. The fairing 143 is open along the bottom from the area 147 just forward of the front wheel 142 to the interior bulkhead 148 just aft of the end of the frame 15, which permits the entire one piece fairing to be rotated about the pivot 146 for rider ingress and egress as shown in phantom in FIG. 14. The interior volume in the fairing 143 aft of the bulkhead 148 serves as a storage area which can be closed with a fabric 151 including a zipper for access to the storage area.

A canopy 144, molded in one piece from clear plastic, is joined to the fairing 143 with mechanical fasteners and a rubber seal in the interfacing joint so that the fairing can be used either with or without the canopy. The canopy 144 is open to the low pressure region behind the trailing edge of the canopy at 159 for ventilation and cooling.

While this invention has been described in terms of a preferred embodiment, it is anticipated that persons skilled in mechanical design upon reading the preceding descriptions and studying the drawings, will realize many possible modifications thereof. For example, two or four planet gears could be used in each set instead of three and they could be mounted in the planet gear carrier on roller or ball bearings instead of the oil filled sintered bronze bushings described in the preferred embodiment. Likewise, the addition of a sun gear and mating set of planet gears would result in a twenty one speed transmission, while the deletion of a sun gear and mating set of planet gears would result in a thirteen speed transmission.

It is therefore intended that the following appended claims be interpreted as including all such modifications and alterations as fall within the true scope and spirit of the present invention.

I claim:

1. In a dual rear wheel driven tricycle with a flat sided hollow frame, an improved fully enclosed multiple speed drive comprising:
   a pedal drive shaft rotatably mounted in the flat sides of a forward portion of said hollow frame;
   a first chain sprocket fixed on said pedal drive shaft for rotation therewith and located outside one sidewall of said hollow frame;
   a spindle passing through holes located in the flat sides of a central portion of said hollow frame;
   a drive fitting rotatably mounted on said spindle;
   a second chain sprocket fixed on said drive fitting for rotation therewith;
   a first bicycle chain coupling said first chain sprocket with said second chain sprocket for driving said drive fitting from said pedal drive shaft;
   a first chain case rigidly fastened to one flat sidewall of said hollow frame and enclosing said first and second chain sprockets and said first bicycle chain, and fixing one end of said spindle;
   a gear case located inside said hollow frame and mounted for concentric rotation about said spindle;
   an internally toothed ring gear located inside said gear case and mounted for concentric rotation about said spindle;
   ring gear locking means operative for selectively locking said ring gear to said hollow frame;

a planet gear carrier mounted for concentric rotation about said spindle;
multiple sets of different size planet gears rotatably mounted on said planet gear carrier, including multiple planet gears of the same size in each set, with all of said planet gears in constant mesh with said ring gear;
a sun gear carrier mounted for concentric rotation about said spindle;
multiple externally toothed sun gears rotatably mounted on said sun gear carrier with each of said multiple sun gears in constant mesh with one of said multiple sets of different size planet gears;
sun gear locking means operative for locking any selected one of said multiple sun gears to said sun gear carrier;
sun gear carrier locking means operative for selectively locking said sun gear carrier to said spindle;
a drive selector keyed to said drive fitting; said drive selector includes an external spline; said sun gear carrier, said planet gear carrier, and said ring gear, all include internal splines; said drive selector is axially operative for selectively and alternately engaging the external spline on said drive selector with said internal splines on said ring gear or said planet gear carrier or said sun gear carrier, for driving said ring gear or said planet gear carrier or said sun gear carrier, respectively, from said drive fitting;
drive selector positioning means;
a first one way clutch coupling said ring gear and said gear case for driving said gear case from said ring gear;
a means for decoupling said first one way clutch when said ring gear is engaged with said drive selector;
a second one way clutch coupling said planet gear carrier and said gear case for driving said gear case from said planet gear carrier;
a third one way clutch coupling said sun gear carrier and said gear case for driving said gear case from said sun gear carrier;
a means for decoupling said third one way clutch when said sun gear carrier is driven by said drive selector;
a third chain sprocket rigidly fixed on said gear case outside said hollow frame;
a torque tube passing through holes in the flat sides of an aft portion of said hollow frame;
a fourth chain sprocket fixed on one end of said torque tube;
a ratchet fitting fixed on the other end of said torque tube;
a second bicycle chain coupling said third chain sprocket with said fourth chain sprocket for driving said torque tube;
a second chain case rigidly fastened to the other flat sidewall of said hollow frame and enclosing said third and fourth chain sprockets and said second bicycle chain, and supporting the other end of said spindle;
an internal cylinder located concentric with said torque tube and between the flat sidewalls of said hollow frame;
a first axle housing rigidly bolted to said second chain case and to a flange on one end of said internal cylinder, with said axle housing extending outward perpendicular to the long axis of said hollow frame;
a second axle housing rigidly bolted to a flange on the other end of said internal cylinder and extending perpendicularly outward on the other side of said frame;
a ball bearing located inside the inboard end of each of said axle housings for rotatably supporting said fourth chain sprocket and said ratchet fitting, respectively;
a ball bearing located inside each end of said torque tube with each of said ball bearings supporting the inboard end of an axle;
a one way clutch coupling the fourth chain sprocket with said axle on one side, and a second one way clutch coupling said ratchet fitting with said axle on the other side;
a ball bearing located in the outboard end of each of said axle housings for supporting the outboard end of each of said axles;
a spline on the outboard end of each of said axles for torsionally fixing a brake drum and a wheel on its respective axle; and
internal threads in the outboard end of each axle with a wheel mounting bolt for clamping said wheel and said brake drum on its respective axle.

2. A fully enclosed multiple speed drive according to claim 1 wherein said ring gear locking means includes a sprocket rigidly fastened to said ring gear inside said hollow frame; at least one ring gear locking pin installed in a hole passing through said first chain case and the side wall of said hollow frame with the axis of said ring gear locking pin normal to the plane of said sprocket, and with the center of said ring gear locking pin in line with the pitch diameter of said sprocket; a plate bolted on the outside of said chain case with a reduced diameter hole through said plate in line with said hole through said chain case and sidewall of said hollow frame; an inboard diameter of said locking pin a close fit in said holes through said chain case and said hollow frame, and an outboard diameter of said locking pin a close fit in said reduced diameter hole through said plate; a compression spring installed over the reduced diameter portion of said locking pin and inside said plate, and biasing said locking pin toward said sprocket; a handle with a rectangular cross section and a full radius on one end; parallel shoulders along the edges of said plate maintaining the axial alignment of said handle on said plate; a slot centered in the end of said handle receiving the outboard diameter of said ring gear locking pin; a transverse hole through said handle normal to the plane of said slot and located off the center of said handle a distance equal to one half the desired axial travel for the locking pin; and a pin captive in said transverse hole and joining said ring gear locking pin to said handle.

3. A fully enclosed multiple speed drive according to claim 1 wherein said sun gear locking means includes multiple external circumferential grooves and a plurality of internal axial grooves in said sun gear carrier; multiple split rings having external teeth and internal teeth being installed in said multiple circumferential grooves, respectively; said multiple sun gears receiving said multiple split rings, respectively; said external teeth on said split rings locking said split rings to said sun gears for rotation therewith; and including a sun gear selector ring with external teeth extending out into said plurality of internal axial grooves in said sun gear carrier for rotation therewith; said external teeth on said sun gear selector ring engaging said internal teeth on said split rings for locking an associated sun gear to said sun gear carrier; and a sun gear selector ring positioning means operative for locating said sun gear selector ring in the plane of any sun gear to lock the selected sun gear to said sun gear carrier.

4. A fully enclosed multiple speed drive according to claim 3 wherein said sun gear selector ring positioning means includes a pair of flanged bushings slidably mounted on said spindle with said sun gear selector ring located outside the cylindrical portions and between the flanges of said pair of flanged bushings; a first screw located in a hole through the center of said spindle; a first pair of transverse pins passing through diametrically opposed slots in said spindle and through holes in said first screw; a shoulder on the opposite ends of each of said pair of transverse pins fitting inside said flanged bushings; a compression spring located in a hole on the axial centerline of said screw keeping said transverse pins pressed firmly against the flanges of said flanged bushings; a first shift knob supported in a fixed axial position by a first mount clamped on one end of said spindle outside said second chain case, with said first mount restrained against rotation; threads on said first shift knob engaging threads on said first screw for controlling the axial position of said first screw; and a spring loaded ball in said first shift knob engaging a detent in said first mount for indicating the rotational orientation of said first shift knob coincident with the axial location of said sun gear selector ring in the plane of each of said multiple sun gears.

5. A fully enclosed multiple speed drive according to claim 1 wherein said sun gear carrier locking means includes a sun gear carrier locking ring slidably mounted on said spindle with internal teeth on said sun gear carrier locking ring engaging axial grooves in said spindle and preventing rotation of said sun gear carrier locking ring; a threaded sleeve located outside said first screw and inside said spindle; a second shift knob supported in a fixed axial position inboard of said first shift knob by said first mount; threads on said second shift knob engaging said threaded sleeve for controlling the axial position of said threaded sleeve; a pin captive in each of a pair of diametrically opposed radial holes in said sun gear carrier locking ring; said pins passing through an axial slot in said spindle and engaging a hole in said threaded sleeve; internal teeth on said sun gear carrier; external teeth and a smooth shoulder inboard of said external teeth on said sun gear carrier locking ring; said smooth shoulder on said sun gear carrier locking ring engaging pawls on said third one way clutch and decoupling said clutch when said sun gear carrier locking ring is in an inboard position; internal teeth on said sun gear carrier meshed with external teeth on said sun gear carrier locking ring when said locking ring is in a central position but unmeshed with said sun gear carrier locking ring is in either an inboard or outboard position; and a spring loaded ball in said second shift knob engaging a detent in said first mount and indicating the rotational position of said second shift knob coincident with said inboard, central, and outboard positions for said sun gear carrier locking ring.

6. A fully enclosed multiple speed drive according to claim 1 wherein said drive selector positioning means includes a pair of flanged bushings slidably mounted on said spindle; a pair of diametrically opposed internal projections on said drive selector ring extending radially inward through slots in said drive fitting to a position between the flanges of said pair of flanged bushings; a second screw located in the hole through the center of said spindle; a pair of transverse pins passing through diametrically opposed slots in said spindle and holes through said second screw; a shoulder on each end of each of said transverse pins fitting inside said flanged bushings; a compression spring located in a hole in the center of said second screw keeping said transverse pins pressed firmly against said bushings; a second mount clamped on the end of said spindle outside said first chain case; a third shift knob axially captive on said second mount; threads on said third shift knob engaging said second screw for controlling the axial position of said second screw; and a spring loaded ball in said third shift knob engaging a detent in said second mount and indicating the rotational orientation of said third shift knob coincident with the axial positions of said drive selector for driving said sun gear carrier, said planet gear carrier, or said ring gear, respectively, from said drive fitting.

7. A fully enclosed multiple speed drive according to claim 1 wherein the means for decoupling said first one way clutch includes spring loaded pawls on said ring gear; projections on said pawls extending radially inward through slots in said internal spline; said pawls being rotated out of engagement with ratchet teeth on said gear case when said external spline on said drive selector is moved into engagement with said internal spline on said ring gear.

8. In a dual rear wheel driven tricycle with a flat sided hollow frame according to claim 1 a steering mechanism comprising:
 a steering tube rotatably supported in said hollow frame with the axis of rotation of said steering tube normal to the flat sides of said hollow frame;
 a handle fixed on each outboard end of said steering tube for applying steering torque to said steering tube;
 a first torque arm fixed on said steering tube inside said hollow frame;
 a fitting bolted in the open forward end of said hollow frame with a front fork rotatably mounted in said fitting;
 a second torque arm fixed on the upper end of said front fork inside said hollow frame; and
 a strut connecting said first torque arm with said second torque arm.

9. In a dual rear wheel driven tricycle with a flat sided hollow frame according to claim 8, with rear axle housings extending perpendicularly outward from said hollow frame, an aerodynamic fairing assembly comprising:
 a hinge arm bolted to said fitting in the open forward end of said hollow frame;
 a pivot rotatably mounted in the forward end of said hinge arm;
 a molded shell rigidly joined to the ends of said pivot; cutouts in said molded shell supported on said axle housings;
 a canopy molded from clear plastic attached to said molded shell; and
 an opening in the aft end of said canopy for cooling and ventillation.

* * * * *